(12) United States Patent
Slesinski et al.

(10) Patent No.: US 6,783,191 B1
(45) Date of Patent: Aug. 31, 2004

(54) AXLE HUBCAP VENT

(75) Inventors: Steven G. Slesinski, Kalamazoo, MI (US); Thomas E. Lyon, Lawton, MI (US)

(73) Assignee: Dana Corporation, Toledo, OH (US)

( * ) Notice: Subject to any disclaimer, the term of this patent is extended or adjusted under 35 U.S.C. 154(b) by 65 days.

(21) Appl. No.: 10/385,923

(22) Filed: Mar. 11, 2003

(51) Int. Cl.[7] .............................................. B60B 7/00
(52) U.S. Cl. ................................ 301/108.1; 301/108.4
(58) Field of Search ........................... 301/108.1, 108.2, 301/108.3, 108.4, 124.1

(56) References Cited

U.S. PATENT DOCUMENTS

| | | | |
|---|---|---|---|
| 2,991,636 A | 7/1961 | Page | 64/27 |
| 3,569,695 A | 3/1971 | McLean | 246/169 D |
| 3,606,475 A | 9/1971 | Quisenberry | 301/112 |
| 3,893,690 A | 7/1975 | Yapp | 301/108.2 |
| 4,834,464 A | 5/1989 | Frehse | 301/108.1 |
| 5,011,233 A | 4/1991 | Nomura et al. | 301/108.1 |
| 5,054,859 A | 10/1991 | Goettker | 301/108.1 |
| 5,195,807 A | 3/1993 | Lederman | 301/108.1 |
| 5,380,103 A | 1/1995 | Lederman | 384/489 |
| 5,482,358 A | 1/1996 | Kuck | 301/108.1 |
| 5,492,393 A | 2/1996 | Peisker et al. | 301/108.1 |
| 5,664,846 A | 9/1997 | Kuck | 301/108.1 |
| 5,752,746 A | 5/1998 | Perry | 301/108.1 |
| 5,785,390 A | 7/1998 | Gold et al. | 301/108.1 |
| 5,860,708 A | 1/1999 | Borders et al. | 301/108.1 |
| 6,203,114 B1 | 3/2001 | Ehrlich | 301/124.1 |
| 6,260,595 B1 | 7/2001 | Cobb | 152/417 |
| 6,273,519 B1 | 8/2001 | Tsou | 301/108.2 |

*Primary Examiner*—Russell D. Stormer
(74) *Attorney, Agent, or Firm*—Dykema Gossett PLLC

(57) ABSTRACT

A wheel end assembly is provided that allows venting of pressurized air from a chamber defined by the hubcap, but prevents entry of contaminants into the chamber. The wheel end assembly includes a hubcap that is configured to be coupled to a wheel and defines a chamber for retaining lubricant for wheel bearings for the wheel. One wall of the hubcap has an aperture in fluid communication with the chamber and a plug is disposed within the aperture. The plug defines a valve for releasing pressurized air from the chamber. The assembly finally includes a cap that is supported on the body of the plug and extends in an outboard direction. The cap is disposed over an outlet of the valve and defines a first fluid chamber in fluid communication with both the outlet of the valve and ambient air. The cap and plug can be inserted into and removed from the aperture as a unit.

20 Claims, 3 Drawing Sheets

AXLE HUBCAP VENT

BACKGROUND OF THE INVENTION

1. Field of the Invention

This invention relates to wheel end assemblies and, in particular, to a wheel end assembly designed to allow venting of excess pressure from a hubcap while protecting against entry of foreign objects and elements.

2. Discussion of Related Art

A conventional wheel end assembly includes a hubcap that is coupled to a vehicle wheel and covers the end of an axle spindle and the wheel bearings upon which the wheel is rotatably mounted. The hubcap provides a reservoir for lubricants for the wheel bearings and also protects the wheel bearings from contaminants. As the temperatures of the wheel bearings rise, the pressure within the chamber defined by the hubcap also rises. Accordingly, a conventional wheel end assembly generally includes means for venting pressurized fluid from the chamber. One conventional venting means comprises an elastomeric plug as shown in any of U.S. Pat. Nos. 5,482,358, 5,752,746, and 5,860,708. The use of an elastomeric plug to vent internal pressure, however, can allow entry of contaminants into the hubcap chamber (e.g., water used during high pressure washing). Accordingly, wheel end assemblies have been developed that incorporate caps that cover the plug outlet and that attempt to both direct the vented pressure and protect the plug from exposure to contaminants as described in the U.S. Pat. Nos. 5,752,746 and 5,860,708.

The above-described wheel end assemblies still have significant drawbacks. The structure for the cap typically includes numerous pieces and are relatively complex. Further, the cap is typically mounted directly to the hubcap or wheel thereby making removal and/or maintenance of the cap and plug difficult.

The inventors herein have recognized a need for a wheel end assembly that will minimize and/or eliminate one or more of the above-identified deficiencies.

SUMMARY OF THE INVENTION

The present invention provides an improved wheel end assembly.

A wheel end assembly in accordance with the present invention includes a hubcap that is configured for coupling to a wheel and that defines a chamber that retains lubricant for wheel bearings for the wheel. A wall of the hubcap has an aperture that is in fluid communication with the chamber. A plug is disposed within the aperture and extends in an outboard direction from the wall of the hubcap. The plug has a body and defines a valve for releasing pressurized fluid from the chamber. The assembly also includes a cap that is supported on the body of the plug and extends in an outboard direction therefrom. The cap is disposed over an outlet of the valve and defines a fluid chamber in fluid communication with the outlet and ambient air.

A wheel end assembly in accordance with the present invention is advantageous. First, the design of the cap is less complex than conventional caps and does not require filters or other inserts. Accordingly, a wheel end assembly in accordance with the present invention is less expensive than conventional wheel end assemblies. Second, because the cap is supported on the plug rather than fastened to the hubcap or wheel, the cap and plug are much easier to install and to remove from the assembly during maintenance as compared to conventional wheel end assemblies. Finally, in accordance with one embodiment of the invention, the cap and plug can be removed as a unit from the assembly.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
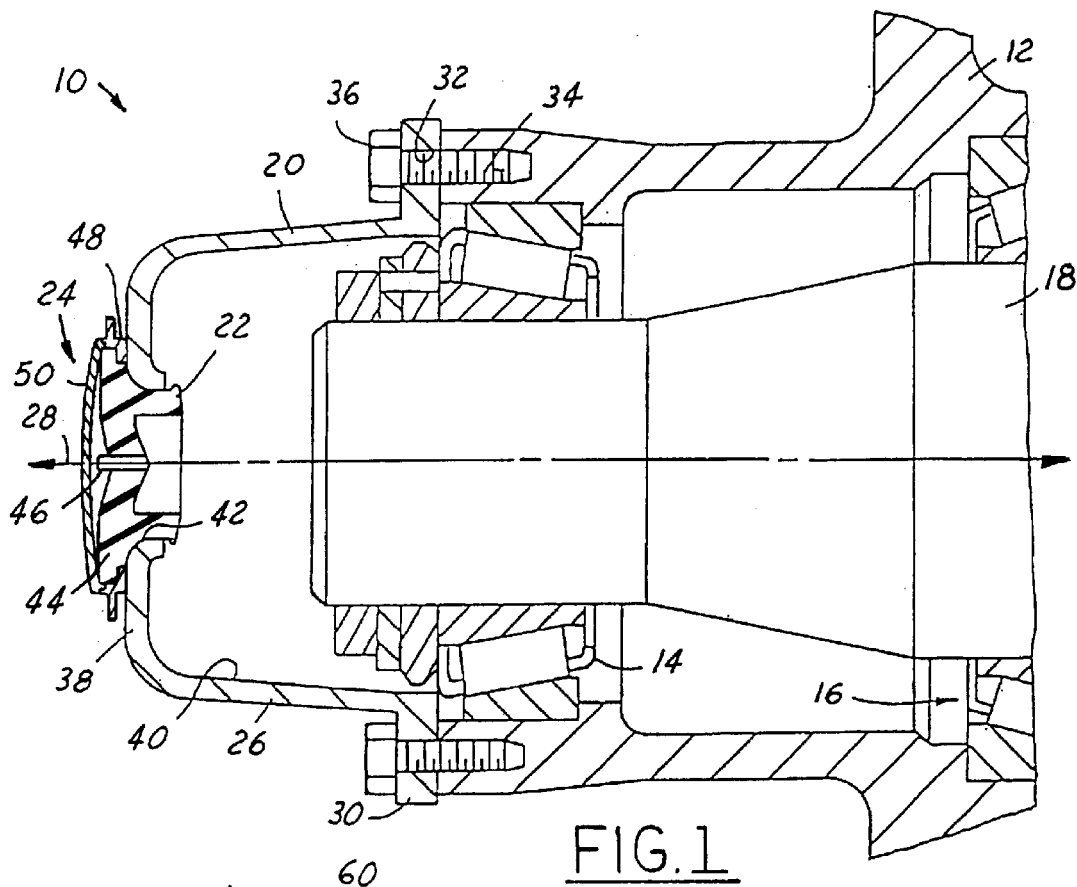
FIG. 1 is a sectional view of a wheel end assembly in accordance with the present invention.

Referring now to the drawings wherein like reference numerals are used to identify identical components in the various views, FIG. 1 illustrate a wheel end assembly 10 in accordance with one embodiment of the present invention mounted to a conventional vehicle wheel 12. Wheel 12 is rotatably supported by conventional inboard and outboard wheel bearings 14, 16 on a conventional axle spindle 18. Assembly 10 is provided to cover spindle 18 and bearings 14, 16 and provides a reservoir for lubricant for bearings 14, 16 while protecting bearings 14, 16 from contaminants. Assembly 10 may include a hubcap 20, a plug 22, and a cap 24 in accordance with the present invention.

Hubcap 20 provides the reservoir for bearing lubricant and protects bearings 14, 16, from exposure to foreign objects and elements. Hubcap 20 is conventional in the art. Hubcap 20 includes a cylindrical wall 26 that is disposed and preferably centered about an axis 28 of rotation for wheel 12 extending through spindle 18. In the illustrated embodiment, wall 26 tapers slightly in an outboard direction, but it will be understood that size, shape, and configuration of hubcap 20 may vary without departing from the spirit of the present invention. Hubcap 20 includes an inboard annular flange 30 that extends radially outwardly from wall 26. Flange 30 may include a plurality of circumferentially spaced apertures 32 configured to align with corresponding apertures 34 in wheel 12 and to receive fasteners 36 used to couple hubcap 20 to wheel 12. Cap 20 also includes an outboard end wall 38 that closes one end of cap 20. Walls 26, 38 define a chamber 40 that retains lubricant for bearings 14, 16. Wall 38 includes an aperture 42 through which pressurized fluid may be vented from chamber 40 as the temperature, and therefore the pressure, within chamber 40 increases. Aperture 42 may be disposed and centered about axis 28.

Plug 22 is provided to vent pressurized fluid from chamber 36 of hubcap 20, but prevent contaminants from entering chamber 36. Plug 22 is conventional in the art. Plug 22 is preferably made from an elastomeric material such as rubber. Plug 22 has a body 44 and defines a valve having an outlet 46 through which fluid may exit chamber 40. The valve may, for example, comprise a duckbill check valve or an umbrella valve. Plug 22 is disposed within aperture 42 in end wall 34 of hubcap 20 and extends in an outboard direction therefrom. Plug may be disposed and centered about axis 28.

Cap 24 is provided to protect plug 22 and particularly valve outlet 46 from exposure to foreign objects or elements yet allow venting of pressurized fluid exiting outlet 46. Cap 24 is supported on body 44 of said plug 22 and extends in an outboard direction therefrom. Cap 24 is disposed over valve outlet 46. Referring now to FIGS. 2–7, in one embodiment of the present invention cap 24 may include first and second members 48, 50. Members 48, 50 may be made from a molded plastic.

Figure 2:
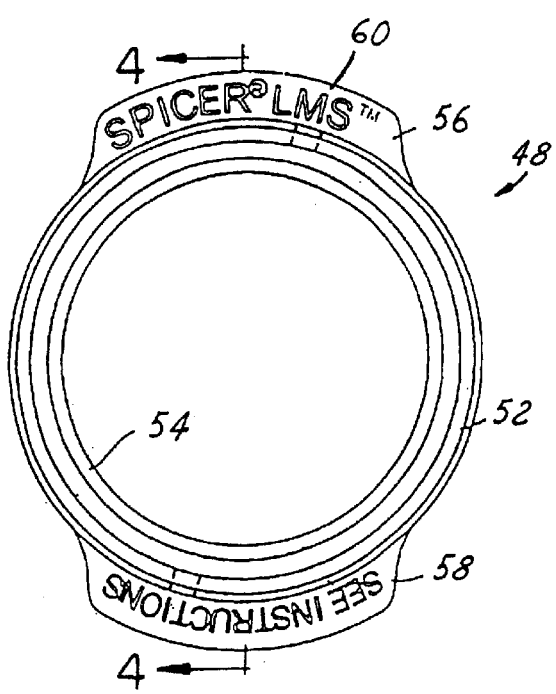
FIG. 2 is a front plant view of one member of a cap of the wheel end assembly of FIG. 1.
Figure 3:
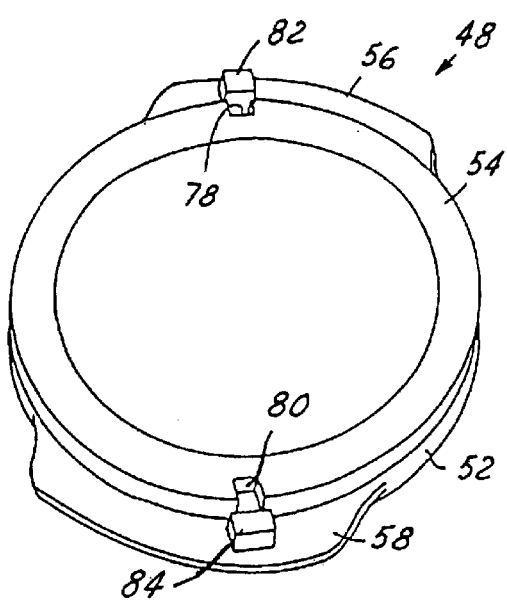
FIG. 3 is a rear perspective view of the member illustrated in FIG. 2.
Figure 4:
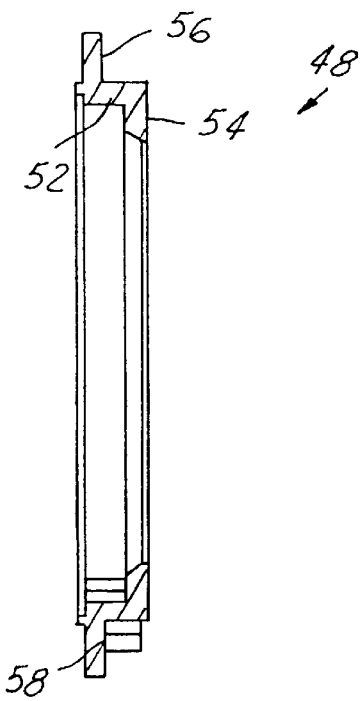
FIG. 4 is a cross-sectional view of the member illustrated in FIG. 2 taken along lines 4—4.

Referring now to FIGS. 2–4, member 48 is provided to mount cap 24 onto plug 22 and to allow insertion and removal of plug 22 and cap 24 as a unit from aperture 42 in hubcap 20. Member 48 may include a cylindrical wall 52 and means, such as radially extending flanges 54, 56, for simultaneously removing cap 24 and plug 22 from said wheel end assembly 10 (and particularly aperture 42 of hubcap 20).

Wall 52 is cylindrical in shape. Referring to FIG. 1, wall 52 may be disposed and centered about axis 28 upon mounting of assembly 10 on wheel 12.

Referring again to FIG. 4, flange 54 extends radially inwardly from an inboard end of wall 52. Flange 54 may be annular in shape and may extend around the entire inner circumference of wall 52. It should be understood, however, that flange 54 may alternatively be dividend into a plurality of arcuate segments. Referring to FIG. 1, flange 54 is supported on plug 22 at a location inboard of the outboard end of plug 22. The inner diameter of flange 54 is smaller than the outer diameter of plug 22 at its outboard end.

Referring again to FIG. 3, flange 56 extends radially outwardly from wall 52 proximate an outboard end of wall 52. Referring to FIG. 2, flange 56 extends over only a portion of the outer circumference of wall 52. Additional flanges, such as flange 58, may also extend radially outwardly from wall 52 proximate an outboard end of wall 52. In the illustrated embodiment, flange 58 has an arcuate length similar to flange 56 and may be disposed diametrically opposite flange 56. Flanges 56, 58 may be grasped by hand or by a tool to allow removal of cap 24 and plug 22 from aperture 42 in hubcap 20. Because of the relative diameters of flange 54 and the outboard end of plug 22, movement of member 48 in an outboard direction using flanges 56, 58 results in a force applied to plug 22 to allow removal of plug 22 from aperture 42. Flanges 56, 58 may also include means such as text 60 for allowing identification of the wheel end assembly 10 or the placement of trademarks.

Figure 5:
FIGS. 5–6 are front and rear plan views of another member of a cap of the wheel end assembly of FIG. 1.
Figure 6:
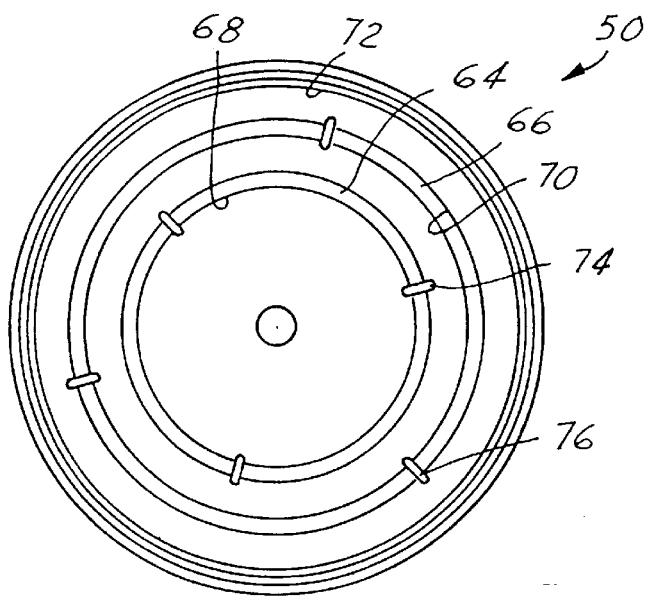
Figure 7:
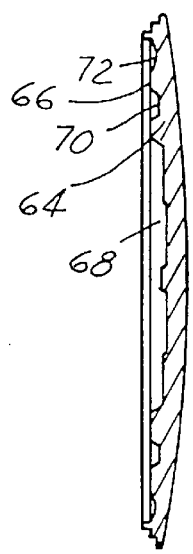
FIG. 7 is a cross-sectional view of the member illustrated in FIGS. 5–6 taken along lines 7—7.

Referring now to FIGS. 5–7, member 50 is generally concave in shape. The outboard surface of member 50 again may includes means such as text 62 for identification of the wheel end assembly 10 or the placement of trademarks. Member 50 may be coupled near its radially outer edge to wall 52 of member 48 by ultrasonic welding or other fastening means. Referring to FIGS. 6–7, member 50 includes a pair of concentric ribs 64, 66. Ribs 64, 66 define three concentric fluid chambers 68, 70, 72. Each of chambers 68, 70, 72 is in fluid communication with valve outlet 46 of plug 22 and ambient air. Chambers 68, 70, 72 are in fluid communication with each other through radial passages 74 in rib 64 between chambers 68, 70 and radial passages 76 in rib 66 between chambers 70, 72. Passages 74, 76 may be equally spaced circumferentially about ribs 64, 66, respectively. Each passage 74 may also be angularly offset from any of passages 76. Although there are three fluid chambers 68, 70, 72 and three each of radial passages 74, 76 in the illustrated embodiment, it should be understood that there may be greater numbers of chambers and passages without departing from the spirit of the present invention. The use of multiple chambers 68, 70, 72 and radial passages 74, 76, as well as the offset nature of passages 74, 76 serve to prevent foreign objects and elements from reaching valve outlet 46 and chamber 40 of hubcap 20.

Figure 8:
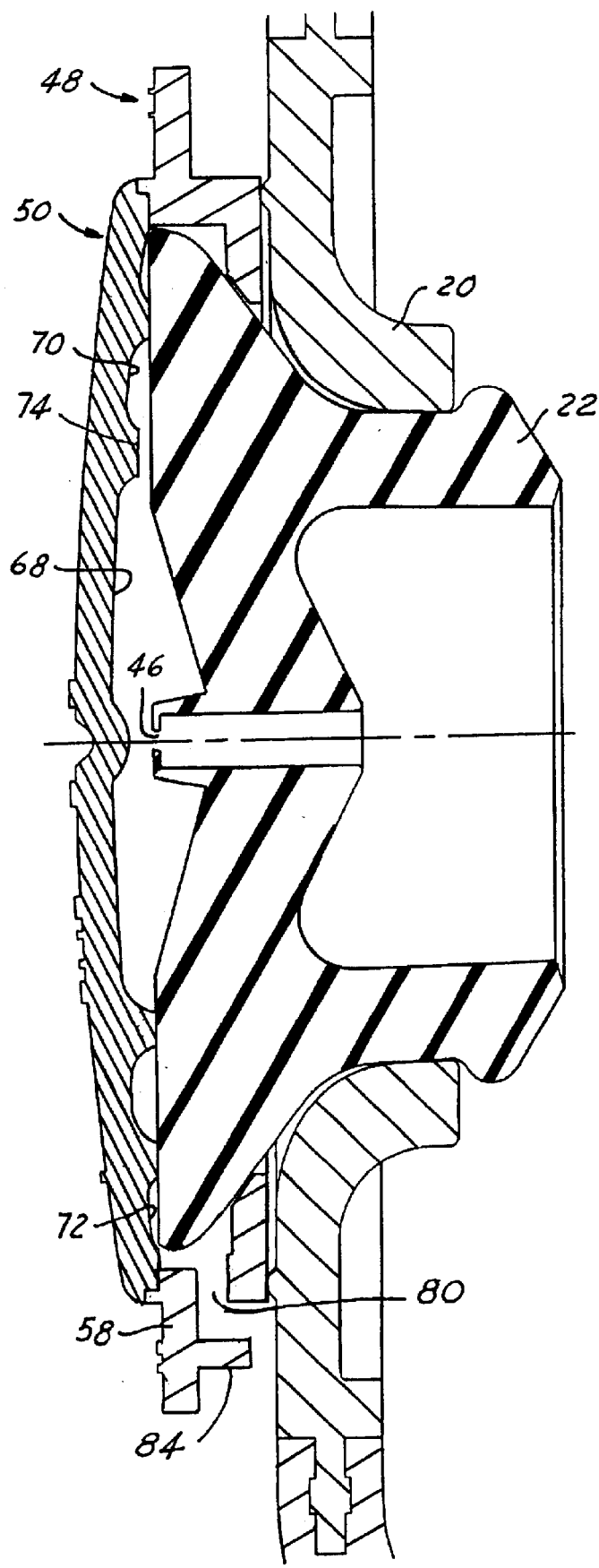
FIG. 8 is a cross-sectional view of a wheel end assembly in accordance with the present invention.

When pressure in chamber 40 of hubcap 20 increases to a predetermined level, the valve formed in plug 22 will vent pressurized fluid through outlet 46. The fluid will enter chamber 68 of member 50 and travel through radial passages 74 to chamber 70 and radial passages 76 to chamber 72. From chamber 72, pressurized fluid will exit through diametrically opposite openings 78, 80 as shown in FIG. 3 and 8. Openings 78, 80 are located on an inboard side of member 48, further reducing the potential for entry of contaminants. Projections 82, 84 are disposed radially outwardly of openings 78, 80 and extend axially in an inboard direction from flanges 56, 58 as an additional means for preventing entry of contaminants.

A wheel end assembly in accordance with the present invention represents a significant improvement as compared to conventional wheel end assemblies. First, the structure of the cap 24 is less complex than conventional designs and therefore less expensive. Second, the cap 24 is supported on the plug 22 and is not coupled to wheel 12 or hubcap 20. As a result, it is much easier to install cap 24 and plug 22 in assembly 10 and to remove cap 24 and plug 22 for maintenance. Third, cap 24 and plug 22 may be removed from and installed into assembly 10 as a unit thereby simplifying assembly.

While the invention has been shown and described with reference to one or more particular embodiments thereof, it will be understood by those of skill in the art that various changes and modifications can be made without departing from the spirit and scope of the invention.

We claim:

1. A wheel end assembly, comprising:
   a hubcap configured for coupling to a wheel and defining a chamber that retains lubricant for wheel bearings for said wheel, a first wall of said hubcap having an aperture in fluid communication with said chamber;
   a plug disposed within said aperture and extending in an outboard direction from said first wall of said hubcap, said plug having a body and defining a valve that releases pressurized fluid from said chamber; and,
   a cap supported on said body of said plug and extending in an outboard direction therefrom, said cap disposed over an outlet of said valve and defining a first fluid chamber in fluid communication with said outlet and ambient air.

2. The wheel end assembly of claim 1 wherein said plug is made from an elastomeric material.

3. The wheel end assembly of claim 1 wherein said cap defines a second fluid chamber concentric with said first fluid chamber and a first radial fluid passage extending between said first and second fluid chambers.

4. The wheel end assembly of claim 3 wherein said cap defines second and third radial fluid passages extending between said first and second fluid chambers and said first, second, and third radial fluid passages are equally circumferentially spaced.

5. The wheel end assembly of claim 3 wherein said cap defines a third fluid chamber concentric with said first and second fluid chambers and a second radial fluid passage extending between said second and third fluid chambers, said first and second radial fluid passages angularly offset from one another.

6. The wheel end assembly of claim 1 wherein said cap includes means for simultaneously removing said cap and said plug from said wheel end assembly.

7. The wheel end assembly of claim 6 wherein said cap includes a cylindrical wall disposed about an outboard end of said plug and said removing means includes:
   a first flange extending radially inwardly from said cylindrical wall and supported on said body of said plug at a location inboard of said outboard end of said plug; and
   a second flange extending radially outwardly from said cylindrical wall.

8. The wheel end assembly of claim 7 wherein said removing means further includes a third flange extending radially outwardly from said cylindrical wall, said third flange diametrically opposite said second flange.

9. The wheel end assembly of claim 1 wherein pressurized fluid flows from said first fluid chamber and exits said cap through an opening located on an inboard side of said cap.

10. A wheel end assembly, comprising:
    a hubcap configured for coupling to a wheel and defining a chamber that retains lubricant for wheel bearings for said wheel, a first wall of said hubcap having an aperture in fluid communication with said chamber;
    a plug disposed within said aperture and extending in an outboard direction from said first wall of said hubcap, said plug having a body and defining a valve that releases pressurized fluid from said chamber; and,
    a cap having:
       a first member supported on said body of said plug
       a second member coupled to said first member, said second member disposed over an outlet of said valve and defining a first fluid chamber in fluid communication with said outlet and ambient air.

11. The wheel end assembly of claim 10 wherein said plug is made from an elastomeric material.

12. The wheel end assembly of claim 10 wherein said second member defines a second fluid chamber concentric with said first fluid chamber and a first radial fluid passage extending between said first and second fluid chambers.

13. The wheel end assembly of claim 12 wherein said second member defines second and third radial fluid passages extending between said first and second fluid chambers and said first, second, and third radial fluid passages are equally circumferentially spaced.

14. The wheel end assembly of claim 12 wherein said cap defines a third fluid chamber concentric with said first and second fluid chambers and a second radial fluid passage extending between said second and third fluid chambers, said first and second radial fluid passages angularly offset from one another.

15. The wheel end assembly of claim 10 wherein said first member includes means for simultaneously removing said cap and said plug from said wheel end assembly.

16. The wheel end assembly of claim 15 wherein said first member includes a cylindrical wall disposed about an outboard end of said plug and said removing means includes:
    a first flange extending radially inwardly from said cylindrical wall and supported on said body of said plug at a location inboard of said outboard end of said plug; and
    a second flange extending radially outwardly from said cylindrical wall.

17. The wheel end assembly of claim 16 wherein said removing means further includes a third flange extending radially outwardly from said cylindrical wall, said third flange diametrically opposite said second flange.

18. A wheel end assembly, comprising:
    a hubcap configured for coupling to a wheel and defining a chamber that retains lubricant for wheel bearings for said wheel, a first wall of said hubcap having an aperture in fluid communication with said chamber;
    a plug disposed within said aperture and extending in an outboard direction from said first wall of said hubcap, said plug having a body and defining a valve that releases pressurized fluid from said chamber; and,
    a cap having:
       a first member supported on said body of said plug; and,
       a second member coupled to said first member, said second member disposed over an outlet of said valve and defining a first fluid chamber in fluid communication with said outlet and ambient air
       wherein pressurized fluid flows from said first fluid chamber of said second member and exits said cap through an opening in said first member located on an inboard side of said first member.

19. The wheel end assembly of claim 18 wherein said first member includes a projection extending in an inboard direction, said projection disposed radially outwardly of said opening.

20. The wheel end assembly of claim 18 wherein said first member includes:
    a cylindrical wall disposed about an outboard end of said plug; and,
    means for simultaneously removing said cap and said plug from said wheel end assembly including:
       a first flange extending radially inwardly from said cylindrical wall and supported on said body of said plug at a location inboard of said outboard end of said plug; and
       a second flange extending radially outwardly from said cylindrical wall.

* * * * *